(12) United States Patent
Tanaka

(10) Patent No.: US 7,527,857 B2
(45) Date of Patent: May 5, 2009

(54) MULTILAYER FILM, LAMINATE USING THE SAME, AND METHOD FOR PRODUCING THE LAMINATE

(75) Inventor: Akira Tanaka, Tokyo (JP)

(73) Assignee: Zeon Corporation, Tokyo (JP)

( * ) Notice: Subject to any disclaimer, the term of this patent is extended or adjusted under 35 U.S.C. 154(b) by 90 days.

(21) Appl. No.: 11/883,582

(22) PCT Filed: Feb. 2, 2006

(86) PCT No.: PCT/JP2006/301758

§ 371 (c)(1),
(2), (4) Date: Aug. 2, 2007

(87) PCT Pub. No.: WO2006/082887

PCT Pub. Date: Aug. 10, 2006

(65) Prior Publication Data

US 2008/0138613 A1    Jun. 12, 2008

(30) Foreign Application Priority Data

Feb. 4, 2005    (JP) ............................. 2005-028608

(51) Int. Cl.
*B32B 7/12* (2006.01)
*B32B 27/30* (2006.01)
*B32B 27/32* (2006.01)
*B32B 27/36* (2006.01)
*B32B 37/16* (2006.01)

(52) U.S. Cl. ........................ 428/337; 428/339; 428/343; 428/346; 428/355 EP; 428/355 AC; 428/412; 428/426; 428/430; 428/441; 428/442; 428/446; 428/451; 428/457; 428/458; 428/461; 428/480; 156/297; 156/299; 156/308.2; 156/327; 156/330

(58) Field of Classification Search ........................ None
See application file for complete search history.

(56) References Cited

U.S. PATENT DOCUMENTS

| | | | |
|---|---|---|---|
| 4,690,999 A | 9/1987 | Numata et al. | |
| 4,792,476 A | 12/1988 | Numata et al. | |
| 4,960,636 A * | 10/1990 | Tomitaka et al. | 428/220 |
| 6,121,171 A * | 9/2000 | Takahashi et al. | 442/289 |
| 6,170,753 B1 * | 1/2001 | Takemura | 235/486 |
| 6,197,145 B1 * | 3/2001 | Todd et al. | 156/245 |
| 6,506,489 B1 * | 1/2003 | Ohura et al. | 428/343 |
| 6,833,180 B1 | 12/2004 | Kodemura | |

FOREIGN PATENT DOCUMENTS

| | | |
|---|---|---|
| JP | 55-160489 A | 12/1980 |
| JP | 60-44338 A | 3/1985 |
| JP | 64-82928 A | 3/1989 |
| JP | 3-64386 A | 3/1991 |
| JP | 3-95286 A | 4/1991 |
| JP | 2002-178423 A | 6/2002 |
| WO | WO-99/01519 A1 | 1/1999 |

* cited by examiner

*Primary Examiner*—Vivian Chen
(74) *Attorney, Agent, or Firm*—Birch, Stewart, Kolasch & Birch, LLP

(57) ABSTRACT

Disclosed is a multilayer film for a strain-free laminate that is used for flexible TFT substrates or the like. Also disclosed are a laminate obtained by arranging such a multilayer film on a substrate made of an inorganic material, and a method for producing such a laminate. Specifically disclosed is a multilayer film wherein an adhesive resin layer that can be adhered to inorganic materials is arranged on a base film made of a resin. This multilayer film has a first average thermal expansion coefficient at temperatures from 60° C. to 80° C. measured during a first raise of the temperature of the multilayer film from 30° C. to 130° C. by heating the multilayer film, which first average thermal expansion coefficient is larger by 30 to 400 ppm/° C. than a second average thermal expansion coefficient measured at temperatures from 60 to 80° C. during a second raise of the temperature from 30° C. to 130° C. after cooling the multilayer film from 130° C. to 30° C. subsequent to the first raise. Also specifically disclosed is a laminate obtained by sticking such a multilayer film onto at least one surface of a substrate made of an inorganic material. Further specifically disclosed is a method for producing such a laminate wherein the multilayer film is stuck to the substrate of an inorganic material at a temperature of not less than 40° C. and not more than the glass temperature of the resin of the adhesive resin layer.

9 Claims, No Drawings

MULTILAYER FILM, LAMINATE USING THE SAME, AND METHOD FOR PRODUCING THE LAMINATE

TECHNICAL FIELD

The present invention relates to a multilayer film, a laminate using the multilayer film, and a method for producing the laminate. In more particular, the present invention relates to a multilayer film that is excellent in adhesion to inorganic materials and therefore capable of providing a laminate free from peeling and deformation when it is stuck to, for example a thin-film transistor substrate made of glass, a laminate using this multilayer film, and a method for producing the laminate.

BACKGROUND ART

Substrates for thin-film transistors, which may sometimes be abbreviated to "TFT", used for devices such as liquid crystals, are ordinarily made of inorganic materials such as glass. The production of a display with a non-plane screen such as a curved one requires a flexible TFT substrate. In order to answer this requirement, researchers have considered making TFT substrates with flexible resin. However, resin is apt to be inferior in barrier properties against gases such as moisture and oxygen gas to inorganic materials such as glass. Then, to provide a substrate with flexibility and gas-barrier properties made by layering a resin film on a glass film has been considered.

A method of producing a flexible TFT substrate by forming a TFT substrate on a glass film that has been layered on a temporary substrate and transferring the glass film to a resin film is known. Concerning this method, the employment of a photosetting or thermosetting adhesive to stick the glass film to the resin film in order to make a laminate substrate is reported. However, when a thermosetting adhesive is used, the shrinkage on curing is large while the glass film is being stuck to the resin film, which often causes problems such as deformation of the substrate and breaking of the wires. On the other hand, when a photosetting adhesive is used, the TFT substrate is irradiated with intense light beams during the curing, which may cause deterioration in the transistors on the TFT and change in their electrical characteristics.

In these situations, the sticking with a thermoplastic resin has been studied. Patent Document 1 teaches that a particular thermoplastic polymer with ring structures is useful as an adhesive for semiconductor materials, and it also discloses a method of sticking with it under a heated and pressurized condition. Patent Document 2 proposes an adhesive including a cycloolefin resin and a solvent and also recommends the sticking under pressure.

Patent Document 1: WO 99/01519 A1
Patent Document 2: JP 3-95286 A

DISCLOSURE OF THE INVENTION

[Problems to be Solved by the Invention]

As explained above, it is not easy to use a laminate made by layering a glass film and a thermoplastic resin film for TFT substrates, because the deformation by heat or the influence by intensive light beams causes problems such as peeling of the glass film from the thermoplastic resin unless some special measures against these problems are not taken during the layering. Also, the sticking methods disclosed in Patent Documents 1 and 2 require heating the laminate at a high temperature. As a result, even when a resin film with ring structures, excellent in transparency, is used, a multilayer film made by layering the resin film and an adhesive resin layer may deteriorate in transparency, affected by a high temperature during the heat treatment.

The objective of the present invention is to provide a multilayer film for a laminate free from deformation, used for flexible TFT substrates as explained above, a laminate comprising the multilayer film layered on a substrate made of an inorganic material, and a method of producing the laminate.

[Means to Solve the Problems]

Means to solve the problems are:

(1) A multilayer film comprising a base film made of a resin, provided with an adhesive resin layer capable of sticking to inorganic materials, wherein the multilayer film has a first average thermal expansion coefficient at temperatures from 60° C. to 80° C. measured during a first raise of the temperature of the multilayer film from 30° C. to 130° C. by heating the multilayer film, which first average thermal expansion coefficient is larger by 30 to 400 ppm/° C. than a second average thermal expansion coefficient measured at temperatures from 60 to 80° C. during a second raise of the temperature from 30° C. to 130° C. after cooling the multilayer film from 130° C. to 30° C. subsequent to the first raise.

(2) The multilayer film according to item (1), wherein the multilayer film includes from 0.6 to 2.3% by mass of a solvent.

(3) The multilayer film according to item (1), wherein the base film is made of at least one resin selected from the group consisting of a polyester resin, a polyether sulfone resin, a chain olefin resin, a resin with alicyclic structures, a polycarbonate resin, an acrylic resin, a methacrylic resin, and a polystyrene resin, and the resin has a glass transition temperature of not less than 80° C.

(4) The multilayer film according to item (1), wherein the adhesive resin layer includes a resin having at least one functional group selected from the group consisting of an acid anhydride group, epoxy group, and carboxyl group.

(5) The multilayer film according to item (1), wherein the multilayer film has a light transmittance of not less than 80% at wavelengths ranging from 400 to 650 nm.

(6) A laminate comprising a substrate made of an inorganic material and the multilayer film as described in item (1), wherein the multilayer film is stuck on at least one face of the substrate.

(7) The laminate according to item (6), wherein the substrate is at least one selected from the group consisting of a glass plate, a silicon wafer, a stainless foil, a cupper foil, an aluminum foil, and a ceramic plate.

(8) The laminate according to item (6), wherein the substrate has a thickness from 0.1 to 200 μm.

(9) A method for producing the laminate according to item (6), comprising sticking the multilayer film as described in item (1) to a substrate made of an inorganic material at a temperature of not less than 40° C. and not more than the glass temperature of the resin of the adhesive resin layer.

[Advantages of the Invention]

The multilayer film according to the present invention has an adhesive resin layer with good adhesion to inorganic materials, so that the multilayer film does not require heating at a high temperature or irradiation with ultraviolet rays to stick the adhesive resin layer to an inorganic substrate such as a glass substrate. This property makes it possible to produce a flexible laminate according to the present invention when the multilayer film is stuck to a glass film or the like. The laminate hardly suffers from peeling, breakage, and cracking, and is appropriate for TFT substrates and the like. The method for producing the laminate according to the present invention is an excellent method for producing the laminate.

BEST MODE TO CARRY OUT THE INVENTION

The multilayer film according to the present invention is a multilayer film comprising a resin base film provided with an adhesive resin layer capable of sticking to inorganic materials. Although there is no special limitation on the resin for the base film, the resin should preferably be an amorphous resin with high transparency and a relatively high glass transition temperature. Examples of the resin may include a polyester resin with a repeating unit including an ester linkage, a poly (ether sulfone) resin with a repeating unit that includes an ether-sulfone linkage, a chain olefin resin with a repeating unit that originates from the corresponding olefin monomer, a resin with alicyclic structures, a polycarbonate resin with a repeating unit that includes a carbonate linkage, an acrylic resin with a repeating unit that originates from acrylic acid, a methacrylic resin with a repeating unit that originates from methacrylic acid, and a polystyrene with a repeating unit that originates from a styrene. Among them, a polystyrene resin and a resin with alicyclic structures are particularly preferable. These resins are well balanced in properties such as heat resistance, optical properties such as light transmittance, adhesion to the resin of the adhesive resin layer, and the thermal expansion coefficient, and can appropriately be used for TFT, a material for liquid crystals. This multilayer film may be composed of two layers, which are one resin base film layer and one adhesive resin layer. Alternatively, the multilayer film may be composed of more than two layers, which are two or more resin base film layers and adhesive resin layers. For example, the resin base film layer may be provided with a resin protective film layer on the opposite side of the face contacting the adhesive resin layer.

The glass transition temperature, which may sometimes be abbreviated to Tg, or the melting point, which may sometimes be abbreviated to Tm, of the resin used for the base film should preferably be not less than 80° C., more preferably not less than 120° C. The Tg or Tm value of the resin for the base film should preferably be the same as or larger than the Tg or Tm value of the resin for the adhesive resin layer, which may sometimes be abbreviated to "adhesive resin". The reason is that the resin for the base film will not soften when the multilayer film is heated to a temperature close to the Tg or Tm of the adhesive resin to be layered on the glass plate, which is a preferable method of producing the laminate according to the present invention as I will explain hereinafter.

The multilayer film according to the present invention has a first average thermal expansion coefficient at temperatures from 60° C. to 80° C. measured during a first raise of the temperature of the multilayer film from 30° C. to 130° C. by heating the multilayer film, which first average thermal expansion coefficient is larger by 30 to 400 ppm/° C. than a second average thermal expansion coefficient measured at temperatures from 60 to 80° C. during a second raise of the temperature from 30° C. to 130° C. by heating the multilayer film after cooling the multilayer film from 130° C. to 30° C. subsequent to the first raise. The purpose of the second heating is to measure the second average thermal expansion coefficient, and therefore the second average thermal expansion coefficient can be measured if the second heating raises the temperature to at least 80° C. The thermal expansion coefficient intended in this invention is the linear thermal expansion coefficient, unless noted otherwise. Generally, the thermal expansion coefficient of the resin is larger than that of inorganic materials. Therefore when a temperature change is applied to a laminate made by sticking the multilayer film to an inorganic material, the difference of their thermal expansion coefficients generates a stress in the stuck parts of the film and the inorganic material, which often causes peeling, cracking, and/or deformation in the multilayer film or the inorganic material. This situation may be prevented from occurring, if the difference in thermal expansion coefficient of the multilayer film before it is stuck to the inorganic material layer should be within a certain range. To adjust the difference between the thermal expansion coefficient values of the multilayer film especially at temperatures close to the temperature at which the multilayer film is used is important.

The thermal expansion coefficient of the resin for the base film of the multilayer film is typically not more than 100 ppm/° C., while inorganic materials such as glass have a thermal expansion coefficient not more than 50 ppm/° C. A difference of this degree will not cause problems such as peeling, cracking, and deformation in a laminate for TFT substrates made by sticking the base film to an inorganic material.

On the other hand, when a thermoplastic resin is used for the adhesive resin layer to stick the base film to an inorganic material, a thermoplastic resin without a solvent will seldom cause problems such as peeling, cracking, and deformation in the laminate made by sticking the base film to an inorganic material because of the difference between the thermal expansion coefficient of the resin and that of the inorganic material. However, the adhesive resin layer that does not include a solvent has no or little adhesion with plates made of inorganic materials such as glass. Therefore the adhesion temperature, or the temperature at which the substrate film is stuck to an inorganic material, has to be raised to a temperature not less than the glass transition temperature or the melting point of the resin forming the adhesive resin layer. When the adhesion temperature is set to a temperature not less than the glass transition temperature or the melting point of the resin forming the adhesive resin layer, the adhesive resin layer and the base film are prone to deteriorate and have coloring, foaming, and deformation, which often makes it impossible to use the laminate for TFT substrates that require transparency and precision.

In view of these problems, the present invention allows the adhesive resin layer to include a predetermined amount of a solvent and sets the thermal expansion coefficient of the multilayer film within a predetermined specific range, and improves the adhesion of the film with inorganic materials. In this invention, when the adhesive resin layer is formed on the base film in the process of producing a multilayer film, an adhesive resin including a solvent or dissolved in a solvent should preferably be used. A resin including a solvent is apt to have a very large thermal expansion coefficient. The coefficient is really large, especially at temperatures of 80° C. or less, because the solvent does not evaporate but remains in the adhesive resin. On the other hand, the coefficient gradually decreases at temperatures of 80° C. or more, because the solvent evaporates away. Therefore when thermal expansion coefficient values of an adhesive resin measured during the first raise of the temperature to 130° C. by the first heating are compared with thermal expansion coefficient values measured during the second raise of the temperature to 130° C. by the second heating after cooling the adhesive resin to 30° C. subsequent to the first raise, the second thermal expansion coefficient values are almost constant irrespective of the temperature. This constant value is close to the thermal expansion coefficient of the adhesive resin that does not include solvents. From these facts I infer that the solvent in the adhesive resin evaporates away during the first heating to measure the first thermal expansion coefficient values and the second series of measurements gives the thermal expansion coefficient of the only adhesive resin. In conclusion, even from a multilayer film including an adhesive resin layer that contains a solvent the solvent can be removed by a single heating treatment, and the thermal expansion coefficient of the adhesive resin per se is revealed.

The multilayer film according to the present invention has a first average thermal expansion coefficient in the first series of measurements carried out at temperatures from 60 to 80° C. that is larger by 30 to 400 ppm/° C. than a second average thermal expansion coefficient in the second series of measurements carried out at temperatures from 60 to 80° C., when the multilayer film is subjected to the heating treatment twice. The difference between the first average thermal expansion coefficient and the second average thermal expansion coefficient should preferably be from 75 to 300 ppm/° C., more preferably from 130 to 270 ppm/° C. In a more preferable embodiment, the multilayer film according to the present invention has a first higher-temperature average thermal expansion coefficient in the first series of measurements carried out at temperatures from 80 to 120° C. larger than a second higher-temperature average thermal expansion coefficient in the second series of measurements carried out at temperatures from 80 to 120° C., by 20 to 70 ppm/° C., preferably by 25 to 65 ppm/° C. The reason that the lower limits of the differences are decided as mentioned above is that the adhesive resin layer should include a solvent to improve its adhesion with inorganic materials, which enables the adhesive resin layer to stick to the inorganic materials without being heated to a high temperature. On the other hand, when the upper limits of the differences exceed the above mentioned, heating for adhesion is prone to cause peeling, deformation, and foaming in the stuck faces when the multilayer film according to the present invention is stuck to an inorganic material. Also, the difference between the first average thermal expansion coefficient measured at temperatures from 60 to 80° C. and the second average thermal expansion coefficient measured at temperatures from 60 to 80° C. is preferably larger than the higher-temperature difference between the first higher-temperature average thermal expansion coefficient measured at temperatures from 80 to 120° C. and the second higher-temperature average thermal expansion coefficient measured at temperatures from 80 to 120° C. when the multilayer film is subjected to the two heating treatment, because the multilayer film satisfying this requirement is capable of further improving its adhesion to inorganic materials and the adhesion does not require that the adhesive resin be heated to a high temperature, or the adhesion can be performed at a temperature not less than 40° C. and not more than the glass transition temperatures of the resin that forms the adhesive resin layer. The thermal expansion coefficient may be measured with a commercially available thermomechanical analyzer in the following way. First, the multilayer film is cut into a piece with a predetermined size. Then, the piece is loaded in a thermomechanical analyzer, and values of the thermal expansion coefficient thereof are measured at temperatures from 30° C. to 130° C. under a load of 0.1 N in an atmosphere of nitrogen gas while the temperature is raised from room temperature at a rate of 5° C./minute, which is the first series of measurements. After the completion of the first series of measurements, the multilayer film is cooled to room temperature, or a temperature not more than 30° C. Values of the thermal expansion coefficient of the multilayer film are again measured at temperatures from 30° C. to 130° C. under a load of 0.1 N while the temperature is raised from room temperature at a rate of 5° C./minute, which is the second series of measurements. From the measured values, lower-temperature averages of the values obtained at temperatures ranging from 60° C. to 80° C. are calculated, and higher-temperature averages of the values obtained at temperatures ranging from 80° C. to 120° C. are calculated. The lower-temperature and higher-temperature averages are regarded as the average thermal expansion coefficients in the respective temperature ranges. The difference between the average thermal expansion coefficient of the first series of measurements and the average thermal expansion coefficient of the second series of measurements in each temperature range can be obtained by subtracting the latter from the former. When it is not necessary to determine the higher-temperature average thermal expansion coefficients in the temperature range between 80° C. and 120° C., the multilayer film may be heated to such a temperature that values of the thermal expansion coefficient in the temperature range from 60° C. to 80° C. can be measured, i.e. 80° C. in the second series of measurements.

The lamination of the multilayer film and an inorganic plate such as a glass plate is carried out typically at a temperature from about 40 to 120° C., preferably at a temperature from 60 to 120° C. by contact-bonding the multilayer film and the inorganic plate. Therefore part of the solvent included in the adhesive resin layer evaporates away, and the produced laminate scarcely includes the solvent in the adhesive resin layer, which means that the thermal expansion coefficient of the adhesive resin layer is close to that of the adhesive resin per se. Quantitative study revealed that the multilayer film, which has the first average thermal expansion coefficient at temperatures from 60° C. to 80° C. measured, by the aforementioned way, during a first raise of the temperature of the multilayer film from 30° C. to 130° C. by heating the multilayer film in the first measurement, which first average thermal expansion coefficient is larger by 30 to 400 ppm/° C. than the second average thermal expansion coefficient measured at temperatures from 60 to 80° C. in the second measurement, includes an appropriate amount of a solvent in the adhesive resin layer, which makes the multilayer film excellent in its adhesion to an inorganic material and the laminate excellent in adhesion and peeling resistance between the layers. This evaluation method provides a very convenient index from the viewpoint of production control, because just the measurement of the thermal expansion coefficient values of a multilayer film is capable of easily distinguishing multilayer films suitable for the production of preferable laminates capable of solving the problems that are assigned to the present invention from those not suitable for it, irrespective of kinds of adhesive resins and solvents.

The multilayer film of the present invention should preferably include a solvent in an amount from 0.6 to 2.3% by mass, more preferably from 0.7 to 1.8% by mass, particularly preferably from 0.8 to 1.5% by mass. When the amount of the solvent is less than the lower limit, there is a probability that the adhesion of the multilayer film to an inorganic material may be lowered. On the other hand, when the amount exceeds the upper limit, peeling of the multilayer film from the inorganic material, deformation of the film, and foaming thereof are prone to take place when the multilayer film according to the present invention is stuck to an inorganic material. The amount of the included solvent is calculated by dissolving a multilayer film in a solvent and analyzing the obtained solution by gas chromatography using the internal standard method. In this analysis, the solvent that dissolves the multilayer film is different from the solvent that is employed when the adhesive resin layer is formed.

In the present invention, although there is no special limitation on resins for the adhesive resin layer, amorphous resins are preferable and those with molecular structures that are the same as or similar to the molecular structures of the resins used for the base film should be employed. Examples of the resins include acrylic resins, polyester resins, chain olefin resins, and resins with alicyclic structures, as described above. Among them are preferred resins with alicyclic structures from the viewpoint of transparency. The resin with alicyclic structures has the alicyclic structures on the main chain and/or branched chains. From the viewpoint of required properties such as mechanical strength and heat resistance, an appropriate resin with alicyclic structures should have the alicyclic structures on the main chain. Examples of the alicyclic structures included in the resins are saturated alicyclic structures, or cycloalkane structures, and unsaturated alicyclic structures, or cycloalkene structures. From the point of view of properties such as mechanical strength and heat resistance, cycloalkane structures are preferable. Although there is no special limitation on the number of carbon atoms that form an alicyclic structure, the number is typically from 4 to 30, preferably from 5 to 20, more preferably from 5 to 15. The number within these ranges provides the resin with highly balanced properties of mechanical strength, heat resistance, and film formability, and therefore is preferable. The proportion of the repeating unit with the alicyclic structure in the resin appropriately used in the present invention should be selected suitably depending on the use of the multilayer film. The proportion should preferably be not less than 30% by mass, more preferably not less than 50% by mass, particularly preferably not less than 70% by mass, most preferably not less than 90% by mass. The resin with alicyclic structures that has the proportion of the repeating unit including the alicyclic structure within these ranges are preferable from the viewpoint of the transparency and heat resistance of the base film.

The resin with alicyclic structures specifically includes (1) norbornene polymers, (2) polymers of cycloolefins with a single ring, (3) polymers of cyclic conjugated dienes, (4) polymers of vinylalicyclic hydrocarbons, and the hydrogenated thereof. Among them are preferred norbornene polymers and polymers of cyclic conjugated dienes from the viewpoints of transparency and formability.

The norbornene polymers (1) may include polymers made through a ring opening polymerization of norbornene monomers, copolymers made through a ring opening copolymerization of norbornene monomers and other monomers that are ring-opening copolymerizable with norbornene monomers, the hydrogenated of the polymers and the copolymers, addition polymers of norbornene monomers, and addition copolymers made through a copolymerization of norbornene monomers and other monomers copolymerizable with norbornene monomers. Among them, particularly preferable are hydrogenated polymers made through a ring opening polymerization of norbornene monomers, and hydrogenated copolymers made through a ring opening copolymerization of norbornene monomers and other monomers that are ring-opening copolymerizable with norbornene monomers, from the viewpoints of heat resistance and mechanical strength.

Examples of the polymers of cycloolefins with a single ring (2) may include addition polymers of cycloolefin monomers each with a single ring, such as cyclohexene, cycloheptene, and cyclooctene.

The polymers of cyclic conjugated dienes (3) may include polymers made by subjecting addition polymers of conjugated diene monomers such as 1,3-butadiene, isoprene, and chloroprene to cyclization reaction, polymers made by 1,2-addition polymerization or 1,4-addition polymerization of cyclic conjugated diene monomers such as cyclopentadiene and cyclohexadiene, and the hydrogenated of the polymers.

The polymers of vinylalicyclic hydrocarbons (4) may include, for example, polymers of vinylalicyclic hydrocarbon monomers such as vinylcyclohexene and vinylcyclohexane, and the hydrogenated of the polymers; the hydrogenated compounds obtained by hydrogenating the aromatic ring fragments of polymers of vinylaromatic hydrocarbon monomers such as a-methylstyrene; and the hydrogenated compounds obtained by hydrogenating the aromatic ring fragments of copolymers, such as random copolymers or block copolymers, of the vinylalicyclic hydrocarbon monomers or the vinylaromatic hydrocarbon monomers, and other monomers polymerizable with these vinylaromatic hydrocarbon monomers. The block copolymers include diblock copolymers, triblock copolymers, multiblock copolymers formed from 4 or more kinds of monomers, and inclined block copolymers.

The resin with alicyclic structures may be selected from known polymers disclosed in, for example, the JP 2002-321302 A publication. The resin forming the adhesive resin layer should preferably have a glass transition temperature from 40 to 190° C., more preferably from 50 to 160° C., particularly preferably from 60 to 145° C.

The adhesive resin layer of the present invention should preferably be formed from a resin with at least one kind of functional group selected from the group consisting of an acid anhydride group, epoxy group, and carboxyl group. The adhesive resin layer made of the resin with the functional groups is capable of further improving its adhesion to the plate made of an inorganic material. The amount of the functional groups included in the resin that forms the adhesive resin layer is preferably from 0.005 to 0.25 mole, more preferably from 0.012 to 0.15 mole, particularly preferable from 0.015 to 0.12 mole, to 100 grams of the resin. In this context, "mole to 100 grams of the resin", or the amount of the functional groups included in 100 grams of the resin, means the amount that is obtained by converting the mass (g) of the functional groups actually included in 100 grams of the resin to an amount expressed in the mole when the functional groups are regarded as molecules and the mass (g) corresponding to the molecular weight of the molecule is regarded as 1 (one) mole.

There is no special limitation on the method of forming the adhesive resin layer, and the method may include solution casting and melt extrusion. Solution casting is preferable because it is capable of applying the resin so that the adhesive resin layer will have a thickness as uniform as possible, and controlling the amount of the solvent included in the multilayer film to a preferable one. When the adhesive resin layer is formed by solution casting, the method specifically includes dissolving the resin in a solvent that is capable of dissolving the resin to produce a varnish, applying the varnish to the resin base film by a method such as reverse roll coating, gravure coating, air knife coating, or blade coating, and drying the obtained to remove the solvent. In this process, the amount of the solvent included in the multilayer film should be within the range described hereinbefore. The conditions for the drying may be selected suitably depending on the kind of the used solvent. The solvent used for forming the adhesive resin layer may include ketones, ethers, esters, and aromatic hydrocarbons and the hydrogenated of the aromatic hydrocarbons. These solvents may be used singly, or two or more may be used in combination.

Since the multilayer film according to the present invention is often used for optical devices such as TFTs for liquid crystals, the light transmittance of the film is important. In the entire range of wavelengths from 400 to 650 nm, the light transmittance of the multilayer film according to the present invention should preferably be not less than 80%, more preferably not less than 85%, particularly preferably not less than 88%. The light transmittance at the entire wavelengths from 400 nm to 650 nm may be measured with a commercial turbidimeter in accordance with JIS K7361-1.

The laminate according to the present invention has a structure formed by layering the multilayer film of the present invention described so far on a plate made of an inorganic material. The inorganic material layer of the laminate according to the present invention may be a plate made of an inorganic material, examples of which include glass such as white glass, soda glass, or a glass film formed by vapor deposition the material of which is silicon oxide; a film of a metal such as aluminum, copper, silicon, or iron, or an oxide thereof; stainless steel, ITO that stands for indium tin oxide, and ceramic.

Among them, glass plates, silicon wafers, stainless steel foil, copper foil, aluminum foil, and ceramic plates are preferable. In particular, glass plates are used for many TFT substrates and make a useful plate for the laminate. The inorganic plate preferably has a thickness from 0.1 to 200 μm. When the inorganic plate is a glass microfilm, the thickness thereof should be from 0.1 to 1 μm. On the other hand, when it is an ordinary glass film, the thickness thereof should be about 1 to 100 μm.

The laminate according to the present invention is preferably made by sticking the multilayer film to the plate at a temperature of not less than 40° C. and not more than the glass temperature of the resin of the adhesive resin layer, when the multilayer film of the present invention is stuck to the plate made of an inorganic material. As explained above, good adhesion between the multilayer film of the present invention and a plate made of an inorganic material, prevention of peeling in and deformation of the laminate after the adhesion, and keeping the transparency are demanded of the laminate according to the present invention. In order to satisfy the requirements, the adhesive resin layer of the multilayer film includes a small amount of a solvent, and by utilizing the quantitative change in the thermal expansion coefficient it realizes both of adhesion when the multilayer film is stuck to the inorganic plate and durability once the sticking is completed. The method of sticking is important because it seriously affects both of the adhesion and the durability. The preparation of the laminate by controlling the sticking temperature effectively provides the laminate according to the present invention. Generally when the sticking is carried out at a temperature lower than 40° C., the adhesion between the multilayer film and the inorganic plate is bad, which often results in peeling of the former from the latter. Besides, the solvent in the adhesive resin layer remains in the layer as it is, which not only increases the thermal expansion coefficient of the adhesive resin layer of the prepared laminate but also may cause foaming due to vaporization of the solvent by changes in the temperature while the laminate is being used. On the other hand, when the sticking is carried out at a temperature higher than the glass transition temperature of the resin of the adhesive resin layer, the adhesive resin layer melts during the sticking, which may cause a seriously large expansion and deformation of the multilayer film. The base film should not be heated to a temperature more than the resin of the film, either, when the sticking is carried out. The sticking temperature in this context corresponds to, for example, the temperature of the pressing face of the pressing means when the multilayer film is pasted and stuck to the inorganic plate with a pressing means. An example of an apparatus with the pressing means is a laminator.

By sticking the multilayer film according to the present invention on a glass film with a thickness of not more than 200 μm is prepared a flexible transparent laminate with perfect gas-barrier properties according to the present invention. The formation of a deposited film of a transparent conductive material, such as an ITO deposited film or an IZO, which stands for indium zinc oxide, deposited film on the glass face of this laminate in advance or after the sticking provides a conductive flexible transparent glass film.

EXAMPLES

The invention is described in more detail by way of working and comparative examples hereinafter. Needless to say, the invention is not limited to these examples. In the working and comparative examples, "parts" and "%" are based on the mass unless noted otherwise.

(1) Methods of Evaluating Resin of Base Film, Resin of Adhesive Resin Layer, Multilayer Film, and Laminate Glass Transition Temperature (Tg)

A glass transition temperature was measured while the temperature was being raised at a rate of 10° C./minute, by differential scanning calorimetry, which is often abbreviated to DSC, according to JIS K7211.

Mass Average Molecular Weight (Mw)

A value reduced from that of standard polystyrene measured by gel permeation chromatography, which is often abbreviated to GPC, was regarded as the mass average molecular weight.

Proportion of Maleic Acid Units

The amount of maleic acid units is measured by titration and the obtained value is converted to a value in the mole to 100 grams of the resin.

Proportion of Epoxy Groups

The amount of epoxy groups is calculated by converting values measured by $^1$H-NMR method to values in the mole to 100 grams of the resin.

Thermal Expansion Coefficient of Multilayer Film

The measurement was carried out in the following steps with a thermomechanical analyzer, which is often abbreviated to TMA.

The multilayer film was cut into a 20 mm×10 mm piece. The piece was loaded in a thermomechanical analyzer, and values of the thermal expansion coefficient thereof were measured at temperatures from 30° C. to 130° C. under a load of 0.1 N in an atmosphere of nitrogen gas while the temperature was being raised from room temperature at a rate of 5° C./minute, which was the first series of measurements. Then, the multilayer film was cooled to room temperature, or a temperature not more than 30° C. Values of the thermal expansion coefficient of the multilayer film were again measured at temperatures from 30° C. to 130° C. under a load of 0.1 N while the temperature was being raised from room temperature at a rate of 5° C./minute, which was the second series of measurements. From the measured values, an average of the values obtained at temperatures ranging from 60° C. to 80° C. was calculated, and another average of the values obtained at temperatures ranging from 80° C. to 120° C. was calculated for each of the first and second series of measurements. The difference between the average thermal expansion coefficient of the first series of measurements and that of the second series of measurements in each temperature range was obtained by subtracting the latter from the former.

Light Transmittance in the Entire Range of Wavelengths, and Haze

The light transmittance was measured according to JIS K7361-1 with a Model NDH2000 Hazemeter produced by Nippon Denshoku Industries, Co., Ltd.

Amount of Solvent Included in Multilayer Film

A portion, or about 200 mg, of a multilayer film was cut out, and the cut piece was weighed accurately. 5 mL of a tetrahydrofuran solution including toluene as the internal standard was weighed precisely. The cut piece was dissolved in the tetrahydrofuran solution so that a solution for measurement was prepared. The obtained solution for measurement was analyzed with a gas chromatograph spectrometer with a flame ion spectrometer, and the amount of the solvent included in the multilayer film was calculated by the internal standard method.

Adhesion Test

The initial adhesion of a laminate made by sticking a multilayer film to a plate of an inorganic material, and an adhesion thereof after a humidity proof test were evaluated by a cross-cut adhesion test explained below. These tests were respectively regarded as an initial adhesion test and an adhesion test after a humidity proof test.

Cross-Cut Adhesion Test

The face of a multilayer film of a sample of a laminate was so cut that 1 mm×1 mm checkers were formed according to JIS K5400. The adhesion test was carried out with a cellophane adhesive tape with a width of 24 mm according to JIS Z1522, and the number of the checkers that were taken by the adhesive tape, to 100 checkers, was counted.

Humidity Proof Test

The followings are the conditions under which the humidity proof test was carried out.

Device of Humidity Proof Test: an EHS-211 MD device produced by ESPEC Corp.
Temperature: 60° C.
Humidity: 90% RH
Pressure: Normal pressures (101 kPa)
Exposed Time Period: 200 Hours Heat Resistance Test (Tests to examine the conditions of adhesion and peeling at the interface, and the existence of foaming at the interface, corrugations, and cracks.)

A laminate made by sticking a multilayer film to a plate of an inorganic material was allowed to stand in an oven the temperature of which was 130° C. for 30 minutes, and the laminate was cooled at room temperature. This operation was repeated three times. Then, the laminate was evaluated. The evaluation of adhesion between the plate of the inorganic material and the multilayer film was carried out by the cross-cut adhesion test above. The condition of peeling at the interface was evaluated by measuring the area of the peeled portions when the cross-cut adhesion test was done. The existence of foaming at the interface, corrugations at the stuck parts, which corrugations are wrinkles of the films caused by the difference in the thermal expansion coefficient, and cracks were checked by observation by the eye.

(2) Synthesis of Adhesive Resin

Synthesis Example 1

Production of Adhesive Resin M-1

In a reactor equipped with a condenser tube, a nitrogen gas-introducing tube, and a pressure-equalizing dropping funnel were placed 201 parts of the hydrogenated (Tg=140° C., hydrogenated proportion: 100%, Mn=about 28,000, may be written as "hydrogenated MTD resin") of a polymer made through a ring opening polymerization of 6-methyl-1,4:5,8-dimethano-1,4,4a,5,6,7,8,8a-octahydronaphthalene, which was a resin with alicyclic structures, 6.37 parts of maleic anhydride, and 470.4 parts of t-butylbenzene. The mixture was heated to 135° C. in an atmosphere of nitrogen gas, and the resin was uniformly dissolved. To this resin solution was added a uniform solution, made by dissolving 1.76 parts of dicumyl peroxide in 33.4 parts of cyclohexanone, portion by portion through titration over 2 hours while the reaction liquid was kept at a temperature of 135° C. Then, the reaction was allowed to continue for 3 hours at 135° C., the reaction product liquid was cooled to room temperature. 2000 parts of toluene was added to the cooled reaction product liquid, so that a uniformly diluted solution was prepared. The uniformly diluted solution was dripped to a mixture of 7000 parts of isopropyl alcohol and 2000 parts of acetone. A resin was solidified. After the resin was separated by filtration, it was dried in a vacuum at 105° C. for 12 hours. A hydrogenated MTD resin modified with maleic acid was obtained. This modified resin was named adhesion resin M-1. Properties of adhesion resin M-1 are summarized in Table 1.

Synthesis Example 2

Production of Adhesive Resin M-2

Another hydrogenated MTD resin modified with maleic acid, named adhesive resin M-2, was prepared. The steps of the preparation were the same as those in Synthesis Example 1, except that the amount of maleic anhydride was changed to 11.76 parts, the amount of dicumyl peroxide was changed to 3.24 parts, and the amount of cyclohexanone was changed to 63.4 parts. Properties of adhesive resin M-2 are summarized in Table 1.

Synthesis Example 3

Production of Adhesive Resin E-1

50 parts of hydrogenated MTD resin, 10 parts of allyl glycidyl ether, 1.5 parts of dicumyl peroxide, and 200 parts of cyclohexane were allowed to react in an autoclave at 150° C. for 3 hours. The obtained product liquid was poured into 500 parts of acetone, so that the reaction product was solidified. After the resin was separated by filtration, it was dried in a vacuum at 105° C. for 12 hours. An epoxy-modified hydrogenated MTD resin was obtained. This modified resin was named adhesion resin E-1. Properties of adhesion resin E-1 are summarized in Table 1.

Synthesis Example 4

Production of Adhesive Resin MIR-1

In a four-necked flask equipped with a stirrer, a thermometer, a reflux condenser, and a nitrogen gas-introducing pipe were placed 100 parts of a polyisoprene that included 83% of cis-1,4-bonding units, 15% of trans-1,4-bonding units, and 2% of 3,4-bonding units, and had a mass average molecular weight of 136,000, and 1570 parts of toluene. After the atmosphere in the flask was replaced with nitrogen gas, the contents in the flask were heated to 85° C. in an oil bath and the polyisoprene was completely dissolved in toluene by stirring. 3.9 parts of p-toluenesulfonic acid was introduced in the solution thus obtained, and a cyclization reaction was carried out while the temperature of the solution was kept at 85° C. and the solution was kept under stirring. The reaction was allowed to continue for 5 hours. Then, the reaction was terminated by the introduction of 400 parts of ion-exchanged water. After 30 minutes from the introduction of ion-exchanged water, an oil layer was separated. The oil layer was washed three times with 400 parts of ion-exchanged water, and the washed was subjected to centrifugation at a velocity of 300 rpm so that water was removed. Then, the remaining oil layer was heated to 130° C., and moisture was completely removed. To the oil layer with moisture having been completely removed was added 3.5 parts of maleic anhydride under stirring. After the mixture was made uniform, the temperature was raised to 160° C. so that toluene was distilled away. Then, the resultant was subjected to addition reaction at 160° C. for 4 hours. The temperature of the oil layer was decreased to 110° C., and an antioxidant, the commercial name of which was Irganox 1010 produced by Ciba Specialty Chemicals, Inc., in an amount of 1000 ppm was added to the oil layer. The resulting mixture was made uniform, and cooled to room temperature. A cyclized polyisoprene modified with maleic acid was obtained. This modified resin was named adhesion resin MIR-1. Properties of adhesion resin MIR-1 are summarized in Table 1.

TABLE 1

|  | Adhesive resin | Proportion of maleic acid units [mole/100 g] | Proportion of epoxy groups [mole/100 g] | Mass average molecular weight | Glass transition temp. [° C.] | Degree of cyclization [%] |
|---|---|---|---|---|---|---|
| Synthesis Example 1 | M-1 | 0.048 | — | 28,500 | 142 | |
| Synthesis Example 2 | M-2 | 0.091 | — | 29,000 | 142 | |
| Synthesis Example 3 | E-1 | — | 0.06 | 27,000 | 142 | |
| Synthesis Example 4 | MIR-1 | 0.018 | — | 103,000 | 63 | |

* In Table 1, the degree of cyclization means the degree of cyclization of the cyclized isoprene. The degree of cyclization was calculated from the areas of the peaks by the protons originating from the double bonds before and after the cyclization reaction, measured by the proton magnetic resonance. Detailed method of the measurement was based on the method taught in (i) m. A. Golub and J. Heller. Can. J. Chem., 41, 937 (1963).

(3) Production of Multilayer Film

Working Example 1

Production of Multilayer Film 1

20 parts of adhesive resin M-1, produced in Synthesis Example 1, was dissolved in 80 parts of cyclopentyl methyl ether, a solvent whose boiling point is 106° C., and the prepared solution was filtered using a filter with screen openings of 1 μm. A resin solution with a viscosity of 130 cps was obtained. The resin solution, which may be referred to as resin solution 1, was applied to a norbornene polymer film, which may be referred to as base film 1, with a doctor blade for a thickness of 100 μm, so that a coated film was obtained. The norbornene polymer had a glass transition temperature of 160° C., and the norbornene polymer film had a thickness of 188 μm, and a light transmission in the entire range of wavelengths of 92.3%. The obtained coated film was dried at 105° C. for 15 minutes and multilayer film 1 was prepared. Properties of multilayer film 1 are shown in Tables 2 and 3.

Working Example 2

Production of Multilayer Film 2

Multilayer film 2 was prepared. The steps of the preparation were the same as those in Working Example 1, except that the coated film was dried at 115° C. for 20 minutes. Properties of multilayer film 2 are shown in Tables 2 and 3.

Working Example 3

Production of Multilayer Film 3

Multilayer film 3 was prepared. The steps of the preparation were the same as those in Working Example 1, except that a commercial cyclized polyolefin film, which had a thickness of 100 μm and a glass transition temperature of 163° C., and was produced and sold under the commercial name of Sumilite FS-1700 by Sumitomo Bakelite Company Limited, in place of base film 1. Properties of multilayer film 3 are shown in Tables 2 and 3.

Working Example 4

Production of Multilayer Film 4

20 parts of adhesion resin E-1 produced in Synthesis Example 3 was dissolved in 80 parts of trimethylbenzene, and the prepared solution was filtered using a filter with screen openings of 1 μm. A resin solution with a viscosity of 210 cps was obtained. The steps of the preparation were the same as those in Working Example 1, except that the this resin solution was used in place of resin solution 1. A multilayer film, named multilayer film 4, was obtained. Properties of multilayer film 4 are shown in Tables 2 and 3.

Working Example 5

Production of Multilayer Film 5

Multilayer film 5 was prepared. The steps of the preparation were the same as those in Working Example 1, except that a commercial polycarbonate film, which had a thickness of 125 μm and a glass transition temperature of 145° C., and was produced and sold under the commercial name of Sumilite FS-1650H by Sumitomo Bakelite Company Limited, in place of base film 1. Properties of multilayer film 5 are shown in Tables 2 and 3.

Working Example 6

Production of Multilayer Film 6

Resin solution MIR-1, produced in Synthesis Example 4, was so dissolved in a 3:1 solution of toluene and ethyl acetate that the concentration of the resin was 28%. A resin solution was thus prepared. The steps of the preparation were the same as those in Working Example 1, except that the resin solution prepared in this working example was used in place of resin solution 1. A multilayer film, named multilayer film 6, was obtained. Properties of multilayer film 6 are shown in Tables 2 and 3.

Comparative Example 1

Production of Multilayer Film 7

Multilayer film 7 was prepared. The steps of the preparation were the same as those in Working Example 1, except that the coated film was dried at 80° C. for 15 minutes. Properties of multilayer film 7 are shown in Tables 2 and 3.

Comparative Example 2

Production of Multilayer Film 8

Multilayer film 8 was prepared. The steps of the preparation were the same as those in Working Example 1, except that the coated film was dried at 90° C. for 15 minutes. Properties of multilayer film 8 are shown in Tables 2 and 3.

Comparative Example 3

Production of Multilayer Film 9

Multilayer film 9 was prepared. The steps of the preparation were the same as those in Working Example 4, except that the coated film was dried at 80° C. for 15 minutes. Properties of multilayer film 9 are shown in Tables 2 and 3.

Comparative Example 4

Production of Multilayer Film 10

Multilayer film 10 was prepared. The steps of the preparation were the same as those in Working Example 5, except that the coated film was dried at 80° C. for 15 minutes. Properties of multilayer film 10 are shown in Tables 2 and 3.

Comparative Example 5

Production of Multilayer Film 11

Multilayer film 11 was prepared. The steps of the preparation were the same as those in Working Example 6, except that the coated film was dried at 80° C. for 15 minutes. Properties of multilayer film 11 are shown in Tables 2 and 3.

Comparative Example 6

Production of Multilayer Film 12

Multilayer film 12 was prepared. The steps of the preparation were the same as those in Working Example 1, except that the coated film was dried at 120° C. for 15 minutes. Properties of multilayer film 11 are shown in Tables 2 and 3.

TABLE 2

|  | Multi-layer film | Light transmittance* [%] | Haze [%] | Thickness of adhesive layer | Amount of solvent [% by mass] |
|---|---|---|---|---|---|
| W. Ex. 1 | 1 | 92 | 1.5 | 11 | 1.2 |
| W. Ex. 2 | 2 | 92 | 1.6 | 11 | 0.85 |
| W. Ex. 3 | 3 | 92 | 1.6 | 11.2 | 1 |
| W. Ex. 4 | 4 | 91 | 2 | 11.2 | 1.2 |
| W. Ex. 5 | 5 | 89 | 2.8 | 11.2 | 1.3 |
| W. Ex. 6 | 6 | 91 | 1.9 | 11 | 1 |
| Co. Ex. 1 | 7 | 90 | 2.1 | 11.3 | 3.1 |
| Co. Ex. 2 | 8 | 90 | 2 | 11.1 | 2.1 |
| Co. Ex. 3 | 9 | 90 | 2.4 | 11.4 | 3.8 |
| Co. Ex. 4 | 10 | 90 | 2.9 | 11.3 | 3.5 |
| Co. Ex. 5 | 11 | 91 | 2 | 11.3 | 3 |
| Co. Ex. 6 | 12 | 90 | 2.1 | 10.9 | 0.3 |

*In this table "W. Ex." is an abbreviation of "Working Example". In the same way, "Co. Ex." is an abbreviation of "Comparative Example".
*"Light transmittance" means the light transmittance in the entire range of wavelengths.

TABLE 3

|  | Multi-layer film | Series of measurement | Average thermal expansion coefficient (60-80° C.) [ppm/° C.] | Difference between 1st coefficient and 2nd coefficient* (60-80° C.) [ppm/° C.] | Average thermal expansion coefficient (80-120° C.) [ppm/° C.] | Difference between 1st coefficient and 2nd coefficient* (80-120° C.) [ppm/° C.] |
|---|---|---|---|---|---|---|
| W. Ex. 1 | 1 | 1st | 350 | 264 | 136 | 45 |
|  |  | 2nd | 86 |  | 91 |  |
| W. Ex. 2 | 2 | 1st | 230 | 146 | 110 | 26 |
|  |  | 2nd | 84 |  | 84 |  |
| W. Ex. 3 | 3 | 1st | 225 | 141 | 120 | 32 |
|  |  | 2nd | 84 |  | 88 |  |
| W. Ex. 4 | 4 | 1st | 288 | 202 | 150 | 61 |
|  |  | 2nd | 86 |  | 89 |  |
| W. Ex. 5 | 5 | 1st | 400 | 312 | 160 | 65 |
|  |  | 2nd | 88 |  | 95 |  |
| W. Ex. 6 | 6 | 1st | 155 | 69 | 108 | 22 |
|  |  | 2nd | 86 |  | 86 |  |
| Co. Ex. 1 | 7 | 1st | 540 | 450 | 200 | 106 |
|  |  | 2nd | 90 |  | 94 |  |
| Co. Ex. 2 | 8 | 1st | 450 | 410 | 165 | 75 |
|  |  | 2nd | 90 |  | 90 |  |
| Co. Ex. 3 | 9 | 1st | 580 | 480 | 195 | 90 |
|  |  | 2nd | 100 |  | 105 |  |
| Co. Ex. 4 | 10 | 1st | 650 | 545 | 185 | 80 |
|  |  | 2nd | 105 |  | 105 |  |
| Co. Ex. 5 | 11 | 1st | 600 | 495 | 185 | 80 |
|  |  | 2nd | 105 |  | 105 |  |

TABLE 3-continued

|  | Multi-layer film | Series of measurement | Average thermal expansion coefficient (60-80° C.) [ppm/° C.] | Difference between 1st coefficient and 2nd coefficient* (60-80° C.) [ppm/° C.] | Average thermal expansion coefficient (80-120° C.) [ppm/° C.] | Difference between 1st coefficient and 2nd coefficient* (80-120° C.) [ppm/° C.] |
|---|---|---|---|---|---|---|
| Co. Ex. 6 | 12 | 1st | 105 | 21 | 100 | 16 |
|  |  | 2nd | 84 |  | 84 |  |

*In this table, "difference between 1st coefficient and 2nd coefficient" means the difference between the average thermal expansion coefficient obtained in the first series of measurement and the average thermal expansion coefficient obtained in the second series of measurement.

(4) Production of Laminate
(Layering of Multilayer Film on Glass Plate)

Working Example 8

Production of Laminate 1

A glass film with a thickness of 50 µm, produced by Matsunami Glass Industries, Ltd., was immersed in a solution of 0.1% aminopropyl triethoxy silane and water for 2 minutes. Then, the treated glass film was dried for 24 hours at room temperature. The resultant glass film was stuck to the face of the adhesive resin layer of the multilayer film obtained in Working Example 1, and the stuck films were so laminate in vacuo with a vacuum laminator that air bubbles were not generated. A laminate, named laminate 1, was obtained. The conditions of the vacuum lamination were that the time period of drawing a vacuum was 15 seconds, the adhesion temperature was 100° C., the adhesion time was 360 seconds, and the adhesion pressure was 1 MPa. Laminate 1 was evaluated by the initial adhesion test, the adhesion test after the humidity proof test, and the heat resistance test. The results are shown in Table 4.

Working Example 9

Production of Laminate 2

Laminate 2 was prepared. The steps of the preparation were the same as those in Working Example 8, except that multilayer film 2, produced in Working Example 2, was used in place of multilayer film 1. Laminate 2 was evaluated with the same methods as in Working Example 8. The results are shown in Table 4.

Working Example 10

Production of Laminate 3

Laminate 3 was prepared. The steps of the preparation were the same as those in Working Example 8, except that multilayer film 3, produced in Working Example 3, was used in place of multilayer film 1. Laminate 3 was evaluated with the same methods as in Working Example 8. The results are shown in Table 4.

Working Example 11

Production of Laminate 4

Laminate 4 was prepared. The steps of the preparation were the same as those in Working Example 8, except that multilayer film 4, produced in Working Example 4, was used in place of multilayer film 1. Laminate 4 was evaluated with the same methods as in Working Example 8. The results are shown in Table 4.

Working Example 12

Production of Laminate 5

Laminate 5 was prepared. The steps of the preparation were the same as those in Working Example 8, except that multilayer film 5, produced in Working Example 5, was used in place of multilayer film 1. Laminate 5 was evaluated with the same methods as in Working Example 8. The results are shown in Table 4.

Working Example 13

Production of Laminate 6

Laminate 6 was prepared. The steps of the preparation were the same as those in Working Example 8, except that multilayer film 6, produced in Working Example 6, was used in place of multilayer film 1. Laminate 6 was evaluated with the same methods as in Working Example 8. The results are shown in Table 4.

Comparative Example 8

Production of Laminate 7

Laminate 7 was prepared. The steps of the preparation were the same as those in Working Example 8, except that multilayer film 7, produced in Comparative Example 1, was used in place of multilayer film 1. Laminate 7 was evaluated with the same methods as in Working Example 8. The results are shown in Table 4.

Comparative Example 9

Production of Laminate 8

Laminate 8 was prepared. The steps of the preparation were the same as those in Working Example 8, except that multilayer film 8, produced in Comparative Example 2, was used in place of multilayer film 1. Laminate 8 was evaluated with the same methods as in Working Example 8. The results are shown in Table 4.

Comparative Example 10

Production of Laminate 9

Laminate 9 was prepared. The steps of the preparation were the same as those in Working Example 8, except that multilayer film 9, produced in Comparative Example 3, was used in place of multilayer film 1. Laminate 9 was evaluated with the same methods as in Working Example 8. The results are shown in Table 4.

Comparative Example 11

Production of Laminate 10

Laminate 10 was prepared. The steps of the preparation were the same as those in Working Example 8, except that multilayer film 10, produced in Comparative Example 4, was used in place of multilayer film 1. Laminate 10 was evaluated with the same methods as in Working Example 8. The results are shown in Table 4.

Comparative Example 12

Production of Laminate 11

Laminate 11 was prepared. The steps of the preparation were the same as those in Working Example 8, except that multilayer film 11, produced in Comparative Example 5, was used in place of multilayer film 1. Laminate 11 was evaluated with the same methods as in Working Example 8. The results are shown in Table 4.

Comparative Example 13

Production of Laminate 12

Laminate 12 was prepared. The steps of the preparation were the same as those in Working Example 8, except that multilayer film 12, produced in Comparative Example 6, was used in place of multilayer film 1, and the adhesion temperature was 60° C. in the vacuum lamination. Laminate 12 was evaluated with the same methods as in Working Example 8. The results are shown in Table 4.

TABLE 4-1

| | Laminate | Initial adhesion test | Adhesion test after humidity proof test | Heat Resistance Test Conditions of adhesion | Peeling at interface |
|---|---|---|---|---|---|
| W. Ex. 8 | 1 | A | A | A | A |
| W. Ex. 9 | 2 | A | A | A | A |
| W. Ex. 10 | 3 | A | A | A | A |
| W. Ex. 11 | 4 | A | A | A | A |
| W. Ex. 12 | 5 | A | A | A | A |
| W. Ex. 13 | 6 | A | A | A | A |
| Co. Ex. 8 | 7 | A | A | A | A |
| Co. Ex. 9 | 8 | A | A | A | A |
| Co. Ex. 10 | 9 | A | A | A | A |
| Co. Ex. 11 | 10 | A | A | A | A |
| Co. Ex. 12 | 11 | A | A | A | A |
| Co. Ex. 13 | 12 | AB | B | B | B |

TABLE 4-2

| | Heat Resistance Test | | | |
|---|---|---|---|---|
| | Foaming at interface | Cracks | Corrugations | Evaluation as a whole |
| W. Ex. 8 | A | A | A | A |
| W. Ex. 9 | A | A | A | A |
| W. Ex. 10 | A | A | A | A |
| W. Ex. 11 | A | A | A | A |
| W. Ex. 12 | A | A | A | A |
| W. Ex. 13 | A | A | A | A |
| Co. Ex. 8 | B | AB | AB | B |
| Co. Ex. 9 | B | AB | AB | B |
| Co. Ex. 10 | B | AB | AB | B |
| Co. Ex. 11 | B | B | B | B |
| Co. Ex. 12 | B | AB | B | B |
| Co. Ex. 13 | B | AB | AB | B |

Criteria for the Evaluation of Each Test and the Evaluation as a Whole in Tables 4 and 5

Adhesion Test (Initial Adhesion Test, Adhesion Test after Humidity Proof Test, and Conditions of Adhesion)
A: No peeled checker/100 checkers
AB: 1-5 peeled checkers/100 checkers
B: 6 or more peeled checkers/100 checkers Conditions of Adhesion
A: No peeled checker/100 checkers
AB: 1-5% of the area of the stuck parts was peeled
B: 5% or more of the area of the stuck parts was peeled Foaming at the Interface
A: No foaming
B: Foaming, including fine foam, was observed Cracks
A: No crack at the interface
B: Cracks were observed at the interface Corrugations
A: No deformation in the films
AB: Wrinkles are observed in parts of the films
B: Wrinkles are observed all over the films Evaluation as a Whole
A: Practical
AB: Can be applicable depending on the use
B: Low practicality

Working Example 15

Production of Flexible Substrate 1

On one side of a 100 mm×100 mm quartz substrate were formed an amorphous silicon film (thickness: 100 nm) as a separation layer, and a $SiO_2$ film (thickness: 100 nm) as a gas-barrier type insulating layer in this order according to the method explained in Working Example 1 of JP 10-125930 A. Thus, a glass microfilm for transferring was obtained. The $SiO_2$ film of the glass microfilm was immersed in a silane coupling agent, which is an ethanol/water (ethanol/water=70/30) uniform solution including 0.1% of S-330 produced by AZ max co., the immersion-treated $SiO_2$ film was dried for 5 minutes at 120° C. The immersion-treated and dried $SiO_2$ film was stuck to the surface of the adhesive resin layer of multilayer film 1, produced in Working Example 1, and both films were so subjected to adhesion with a vacuum laminator that air bubbles were not generated. The conditions of the vacuum lamination were that the time period of drawing a vacuum was 15 seconds, the adhesion temperature was 100° C., the adhesion time was 360 seconds, and the adhesion pressure was 1 MPa. The stuck films were irradiated with Xe–Cl excimer laser beams, the wavelength of which was 308 nm, from the side of the quartz substrate, to cause peeling between multilayer film 1 with the SiO$_2$ film stuck and the quartz substrate with the separation layer. This operation provided flexible substrate 1, the norbornene polymer of which had the transferred SiO$_2$ film via the adhesion resin layer. Flexible substrate 1 was evaluated with the same methods as in Working Example 8. The results are shown in Table 5. When flexible substrate 1 was so bent at an angle of 30° that the SiO$_2$ film was on the compressed or inner side, peeling of the SiO$_2$ film and cracks in the film were not observed.

Working Example 16

Production of Flexible Substrate 2

Flexible substrate 2 was prepared. The steps of the preparation were the same as those in Working Example 15, except that multilayer film 4, produced in Working Example 4, was used in place of multilayer film 1. Flexible substrate 2 was evaluated with the same methods as in Working Example 8. The results are shown in Table 5. When flexible substrate 2 was so bent at an angle of 30° that the SiO$_2$ film was on the compressed or inner side, peeling of the SiO$_2$ film and cracks in the film were not observed.

Comparative Example 15

Production of Flexible Film 3

Flexible substrate 3 was prepared. The steps of the preparation were the same as those in Working Example 15, except that multilayer film 7, produced in Comparative Example 7, was used in place of multilayer film 1. Flexible substrate 3 was evaluated with the same methods as in Working Example 8. The results are shown in Table 5. When flexible substrate 3 was so bent at an angle of 30° that the SiO$_2$ film was on the compressed or inner side, peeling of the SiO$_2$ film and cracks in the film were not observed.

Comparative Example 16

Production of Flexible Film 4

To the SiO$_2$ film of the glass microfilm for transferring was applied an ultraviolet-curing adhesive, which was produced and sold under the commercial name of UVZ-108E by NOGAWA CHEMICAL Co., Ltd., so that the thickness thereof was 30 μm. Base film 1 was stuck to the glass microfilm through this adhesive, and the stuck films were irradiated with ultraviolet rays (6000 mj/m$^2$) from the side of the base film. Then, the resultant was irradiated with Xe—Cl excimer laser beams, the wavelength of which was 308 nm, from the side of the quartz substrate, to cause peeling between base film 1 with the SiO$_2$ film stuck and the quartz substrate with the separation layer. During the peeling, stress due to cure shrinkage of the adhesive worked on the substrate and large cracks were observed in the glass microfilm. Besides, when the glass substrate for transferring was heated, the cure shrinkage of the glass microfilm advanced at a temperature just exceeding 60° C. to such an extent that the volume of the microfilm reduced by about 4%, so that spiderweb-like fine cracks were observed all over the glass microfilm.

TABLE 5-1

| | Flexible substrate | Initial adhesion test | Adhesion test after humidity proof test | Heat Resistance Test Conditions of adhesion | Peeling at interface |
|---|---|---|---|---|---|
| W. Ex. 15 | 1 | A | A | A | A |
| W. Ex. 16 | 2 | A | A | A | A |
| Co. Ex. 15 | 3 | A | AB | A | A |
| Co. Ex. 16 | 4 | B | B | B | B |

TABLE 5-2

| | Heat Resistance Test | | | |
|---|---|---|---|---|
| | Foaming at interface | Cracks | Corrugations | Evaluation as a whole |
| W. Ex. 15 | A | A | A | A |
| W. Ex. 16 | A | A | A | A |
| Co. Ex. 15 | B | B | B | B |
| Co. Ex. 16 | B | B | B | B |

The followings can be understood from the results above. The laminates made by sticking multilayer films produced in the working examples, which had a first average thermal expansion coefficient at temperatures from 60° C. to 80° C. measured during a first raise of the temperature of the multilayer film from 30° C. to 130° C. by heating the multilayer film, which first average thermal expansion coefficient is larger by 30 to 400 ppm/° C. than a second average thermal expansion coefficient measured at temperatures from 60 to 80° C. during a second raise of the temperature from 30° C. to 130° C. after cooling the multilayer film from 130° C. to 30° C. subsequent to the first raise, to the plates made of the inorganic materials, did not have problems such as peeling between the stuck layers, foaming, cracks, and deformation, and exhibited strong adhesion to the plates made of the inorganic materials. On the other hand, the laminate made by sticking the multilayer films produced in the comparative examples to the plates of inorganic materials not only had problems such as peeling between the stuck layers, foaming, cracks, and deformation, but also showed week adhesion to the plates.

INDUSTRIAL APPLICABILITY

The multilayer film and laminate according to the present invention are useful for the production of liquid crystal devices and organic EL elements. In particular, the multilayer film and laminate according to the present invention can be materials appropriate for the substrates for thin-film transistors.

I claim:

1. A multilayer film comprising a resin base film provided with an adhesive resin layer capable of sticking to inorganic materials, wherein the multilayer film has a first average thermal expansion coefficient at temperatures from 60° C. to 80° C. measured during a first raise of the temperature of the multilayer film from 30° C. to 130° C. by heating the multilayer film, which first average thermal expansion coefficient is larger by 30 to 400 ppm/° C. than a second average thermal expansion coefficient measured at temperatures from 60 to 80° C. during a second raise of the temperature from 30° C. to 130° C. after cooling the multilayer film from 130° C. to 30° C. subsequent to the first raise.

2. The multilayer film according to claim 1, wherein the multilayer film includes a solvent in an amount from 0.6 to 2.3% by mass.

3. The multilayer film according to claim 1, wherein the base film is at least one resin selected from the group consisting of a polyester resin, a polyether sulfone resin, a chain olefin resin, a resin with alicyclic structures, a polycarbonate resin, an acrylic resin, a methacrylic resin, and a polystyrene resin, wherein said resin has a glass transition temperature of not less than 80° C.

4. The multilayer film according to claim 1, wherein the adhesive resin layer includes a resin having at least one functional group selected from the group consisting of an acid anhydride group, epoxy group, and carboxyl group.

5. The multilayer film according to claim 1, wherein the multilayer film has a light transmittance of not less than 80% at wavelengths ranging from 400 to 650 nm.

6. A laminate comprising a substrate made of an inorganic material and the multilayer film as described in claim 1, the multilayer film being stuck on at least one face of the substrate.

7. The laminate according to claim 6, wherein the substrate is at least one selected from the group consisting of a glass plate, a silicon wafer, a stainless foil, a cupper foil, an aluminum foil, and a ceramic plate.

8. The laminate according to claim 6, wherein the substrate has a thickness from 0.1 to 200 μm.

9. A method for producing the laminate as described in claim 6, comprising sticking the multilayer film to a substrate made of an inorganic material at a temperature of not less than 40° C. and not more than the glass temperature of the resin of the adhesive resin layer.

* * * * *